(12) United States Patent
Shachar et al.

(10) Patent No.: US 11,977,656 B2
(45) Date of Patent: May 7, 2024

(54) MULTI-TENANT DATA PROTECTION USING TENANT-BASED TOKEN VALIDATION AND DATA ENCRYPTION

(71) Applicant: EMC IP Holding Company LLC, Hopkinton, MA (US)

(72) Inventors: Tomer Shachar, Omer (IL); Maxim Balin, Gan Yavne (IL); Yevgeni Gehtman, Modi'in (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 330 days.

(21) Appl. No.: 17/151,424

(22) Filed: Jan. 18, 2021

(65) Prior Publication Data
US 2022/0229928 A1    Jul. 21, 2022

(51) Int. Cl.
```
G06F 21/62      (2013.01)
G06F 16/248     (2019.01)
G06F 21/31      (2013.01)
G06F 21/60      (2013.01)
G06F 21/10      (2013.01)
```

(52) U.S. Cl.
CPC ........ G06F 21/6227 (2013.01); G06F 16/248 (2019.01); G06F 21/31 (2013.01); G06F 21/602 (2013.01); *G06F 21/107* (2023.08)

(58) Field of Classification Search
CPC .... G06F 21/6227; G06F 16/248; G06F 21/31; G06F 21/602; G06F 2221/0751; G06F 21/6218
See application file for complete search history.

(56) References Cited

U.S. PATENT DOCUMENTS

| | | | | |
|---|---|---|---|---|
| 9,223,612 B1* | 12/2015 | Feldman | ............... | G06F 3/0652 |
| 9,992,186 B1* | 6/2018 | Drozd | .................. | H04L 63/102 |
| 10,013,364 B1* | 7/2018 | O'Brien | ............. | G06F 21/6218 |
| 10,044,723 B1* | 8/2018 | Fischer | ................. | H04L 63/102 |
| 2012/0117120 A1* | 5/2012 | Jacobson | ............ | G06F 16/2455 |
| | | | | 715/838 |

(Continued)

OTHER PUBLICATIONS https://cpl.thalesgroup.com/faq/data-security-in-the-cloud/how-do-i-secure-my-data-in-a-multitenant-cloud-environment, downloaded Jan. 12, 2021.

(Continued)

*Primary Examiner* — Harunur Rashid
(74) *Attorney, Agent, or Firm* — Ryan, Mason & Lewis, LLP

(57) ABSTRACT

Techniques are provided for multi-tenant data protection using tenant-based token validation and data encryption. One method comprises obtaining, from a user, a data record to be stored in a multi-tenant storage environment and a token associated with the user. Each data record identifies a tenant associated with the respective data record and the user is authorized to access tenant data of at least one tenant identified in the token. An encryption key of the tenant associated with the data record is obtained and the data record is encrypted using the obtained encryption key and stored. A given data record may be read by obtaining a decryption key of the tenant associated with the given data record and decrypting the given data record using the decryption key. The token may be used to evaluate whether the user is authorized to access the tenant data of the tenant associated with the given data record.

20 Claims, 9 Drawing Sheets

(56) References Cited

U.S. PATENT DOCUMENTS

2019/0191189 A1* 6/2019 Shen ..................... H04L 67/565
2020/0257815 A1* 8/2020 Huang ................ G06F 21/6218
2022/0222363 A1* 7/2022 Rupawalla .......... G06F 21/6209

OTHER PUBLICATIONS https://s3-eu-west-1.amazonaws.com/ce-sr/CA/security/Protecting+customer+data.pdf, downloaded Jan. 12, 2021.
http://dimacs.rutgers.edu/archive/Workshops/CloudComputing/Slides/linn.pdf, downloaded Jan. 12, 2021.
https://www.hytrust.com/secure-multi-tenant-environments/, downloaded Jan. 12, 2021.
https://www.joe0.com/2017/06/24/multi-tenancy-and-data-protection-of-paas-cloud-solutions/, downloaded Jan. 12, 2021.

* cited by examiner

| RECORD IDENTIFIER | TENANT IDENTIFIER | DATA VALUE |
|---|---|---|
| RECORD 241 | TENANT 1 | A1 |
| RECORD 242 | TENANT 2 | B1 |
| RECORD 243 | TENANT 1 | C1 |
| RECORD 244 | TENANT 3 | D1 |
| ... | | ... |

```
{
  USER ID: 1234567890
  USER NAME: JOHN DOE
  ADMIN: TRUE
  TENANT(S): TENANT 1, TENANT 3
}
```

{
USER ID: 1234567891
USER NAME: JANE DOE
ADMIN: TRUE
TENANT(S): TENANT 341, TENANT 342
}

| RECORD IDENTIFIER | TENANT IDENTIFIER | DATA LOCATION | DATA VALUE |
|---|---|---|---|
| RECORD 371 | TENANT 341 | ISRAEL | A2 |
| RECORD 372 | TENANT 341 | USA | B2 |
| RECORD 373 | TENANT 342 | ISRAEL | C2 |
| RECORD 374 | TENANT 343 | ISRAEL | D2 |
| ... | ... | ... | ... |

MULTI-TENANT DATA PROTECTION USING TENANT-BASED TOKEN VALIDATION AND DATA ENCRYPTION

FIELD

The field relates generally to information processing systems and more particularly, to the protection of data in such information processing systems.

BACKGROUND

Data protection techniques are often employed to secure data. A multi-tenant storage environment provides storage for multiple customers or "tenants" of a storage service provider. Many organizations do not trust a multi-tenant storage environment for the storage of sensitive information. Such organizations fear threats, for example, from another tenant of a given multi-tenant storage environment.

A need exists for improved techniques for protecting data in a multi-tenant storage environment.

SUMMARY

In one embodiment, a method comprises obtaining, from a user, (i) at least one data record to be stored in a multi-tenant storage environment, and (ii) a token associated with the user, wherein each data record identifies a tenant associated with the respective data record and wherein the user is authorized to access tenant data of at least one tenant identified in the token; obtaining an encryption key of the tenant associated with the at least one data record; encrypting the at least one data record using the obtained encryption key; and storing the encrypted at least one data record.

In some embodiments, a given data record is read by obtaining a decryption key of the tenant associated with the given data record and decrypting the given data record using the decryption key. The token may be used to evaluate whether the user is authorized to access the tenant data of the tenant associated with the given data record.

Other illustrative embodiments include, without limitation, apparatus, systems, methods and computer program products comprising processor-readable storage media.

BRIEF DESCRIPTION OF THE DRAWINGS

FIG. 2B illustrates an exemplary set of data records to be stored using the multi-tenant data storage process of FIG. 2A, according to some embodiments of the disclosure;

FIG. 2C illustrates an exemplary access token for use in a multi-tenant storage environment, according to one or more embodiments of the disclosure;

FIG. 3B illustrates an access token received from another exemplary user in a multi-tenant storage environment in conjunction with the read process of FIG. 3A, according to one or more embodiments of the disclosure;

FIG. 3C illustrates an exemplary set of data records stored in a multi-tenant storage environment, according to some embodiments;

DETAILED DESCRIPTION

Figure 1:
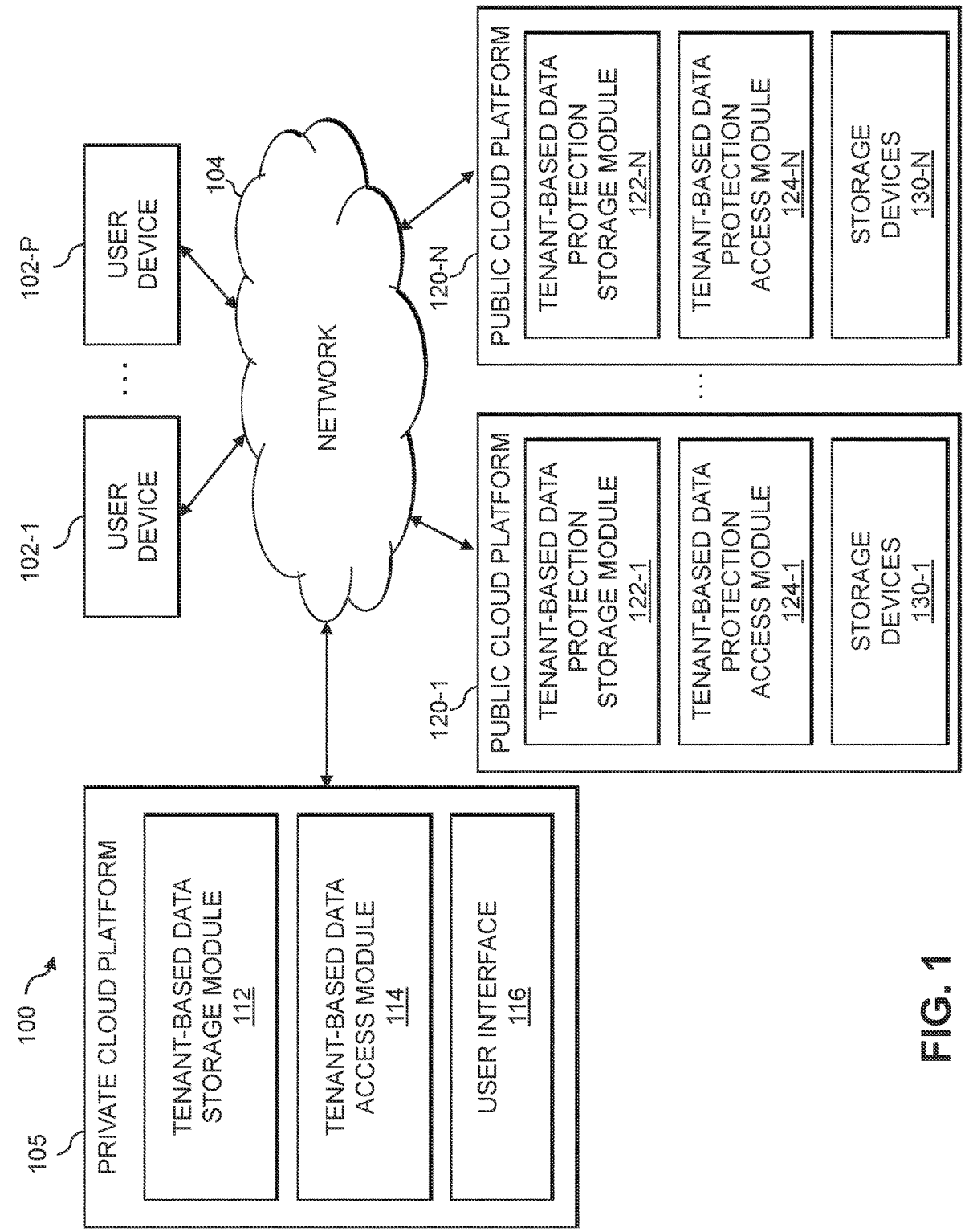
FIG. 1 illustrates an information processing system configured for multi-tenant data protection using tenant-based token validation and data encryption in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for multi-tenant data protection using tenant-based token validation and data encryption.

In one or more embodiments, techniques are provided for the protection of data in a multi-tenant storage environment by employing a token that identifies one or more tenants for which a user is authorized to access the data of the identified tenants. It is to be appreciated that the term "tenant" as used herein is intended to be broadly construed so as to encompass any group of users, such as a customer of a storage service provider, users of a business entity (e.g., users in a department of a company or an academic institution), users of an organization (e.g., users in a particular company, enterprise or non-profit entity), users of a given role, as well as various combinations of such entities.

A token comprises an object representing that a given user has been authenticated and is typically generated upon a successful authentication of the given user. In some embodiments, a new token is generated for each session of the given user, indicating the current tenant access authorizations of the given user. It is noted that in one or more embodiments a given user may inherit the authorizations or privileges of one or more user groups to which the given user belongs.

In at least some embodiments, the disclosed tenant-based token validation techniques can evaluate a token, for example, in conjunction with a read or write request, to determine whether a given user is authorized to access the data of a given tenant associated with the read or write request. In addition, the disclosed tenant-based data encryption techniques are employed to encrypt data being stored using an encryption key of the tenant associated with the data being stored. Likewise, a given stored data record can be read (for example, by a user with the appropriate tenant-based token credentials) by decrypting the given stored data record using a decryption key of the tenant associated with the given stored data record.

Data in transit comprises data being moved between locations, such as over a network. Data protection measures for data in transit are important, as data is typically considered to be exposed to attackers while the data is in motion. Data at rest comprises data that is not actively moving, such as stored data. Data protection measures for data at rest are also important as data at rest may also be considered a valuable target to an attacker.

Role-based access control (RBAC) assigns various permissions to users based on the role of each user within an organization. Users can be grouped into roles, for example, based on common responsibilities and needs. Users are assigned one or more roles and each role can be assigned one or more permissions or privileges. RBAC mechanisms are often implemented using tokens. For example, a request to access information by a given user can be verified using a token that identifies the permissions of the given user.

FIG. 1 shows a computer network (also referred to herein as an information processing system) 100 configured in accordance with an illustrative embodiment. The computer network 100 comprises a plurality of user devices 102-1 through 102-P, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a private cloud platform 105 and one or more public cloud platforms 120-1 through 120-N (hereinafter, collectively referred to as public cloud platforms 120).

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 102 may comprise a network client that includes networking capabilities such as ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (IO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

In at least some embodiments, the private cloud platform 105 further comprises a tenant-based data storage module 112, a tenant-based data access module 114, and a user interface 116. The tenant-based data storage module 112 and the tenant-based data access module 114 can be used by a given tenant, for example, to write data of the given tenant to, and read data of the given tenant from, respectively, one or more public cloud platforms 120 using the disclosed tenant-based techniques. In one variation, the functionality of the tenant-based data storage module 112 and/or the tenant-based data access module 114, or portions thereof, can be provided by a given user device 102 attempting to write tenant data to, and/or read tenant data from, one or more storage devices 130 on the public cloud platforms 120, as discussed below.

It is to be appreciated that this particular arrangement of modules 112 and 114 illustrated in the private cloud platform 105 of the FIG. 1 embodiment is presented by way of example only, and alternative arrangements can be used in other embodiments. For example, the functionality associated with modules 112 and 114 in other embodiments can be combined into a single module, or separated across a larger number of modules. As another example, multiple distinct processors can be used to implement different ones of modules 112 and 114 or portions thereof.

At least portions of modules 112 and 114 may be implemented at least in part in the form of software that is stored in memory and executed by a processor. An exemplary process utilizing modules 112 and 114 of an example private cloud platform 105 in computer network 100 will be described in more detail with reference to the flow diagrams of, for example, FIGS. 2A, 3A and 4.

The user devices 102 and the private cloud platform 105 may be implemented on a common processing platform, or on separate processing platforms.

The public cloud platforms 120 illustratively comprise processing devices of one or more processing platforms. For example, the public cloud platforms 120 can comprise one or more processing devices each having a processor and a memory, possibly implementing virtual machines and/or containers, although numerous other configurations are possible.

The public cloud platforms 120 can be part of cloud infrastructure such as an Amazon Web Services (AWS) system. Other examples of cloud-based systems that can be used to provide at least portions of the public cloud platforms 120 include Google Cloud Platform (GCP), Microsoft Azure, Dell Technologies Cloud, IBM Cloud, Alibaba Cloud and HPe (Hewlett Packard Enterprise) Cloud.

The public cloud platforms 120 each comprise one or more storage devices 130-1 through 130-N. The storage devices 130 store data of a plurality of storage volumes, such as respective logical units (LUNs) or other types of logical storage volumes. The term "storage volume" as used herein is intended to be broadly construed, and should not be viewed as being limited to any particular format or configuration.

In the example of FIG. 1, each public cloud platform 120 further comprises a tenant-based data protection storage module 122 and a tenant-based data protection access module 124. The tenant-based data protection storage module 122 and the tenant-based data protection access module 124 can be used by a given public cloud platform 120, for example, to process requests from a given tenant to write data to, and process requests from a given tenant to read data from, respectively, the respective public cloud platform 120 using the disclosed tenant-based techniques.

It is to be appreciated that this particular arrangement of modules 122 and 124 illustrated in the public cloud platform 120 of the FIG. 1 embodiment is presented by way of example only, and alternative arrangements can be used in other embodiments. For example, the functionality associated with modules 122 and 124 in other embodiments can be combined into a single module, or separated across a larger number of modules. As another example, multiple distinct processors can be used to implement different ones of modules 122 and 124 or portions thereof.

At least portions of modules 122 and 124 may be implemented at least in part in the form of software that is stored in memory and executed by a processor. An exemplary process utilizing modules 122 and 124 of an example public cloud platform 120 in computer network 100 will be described in more detail with reference to the flow diagrams of, for example, FIGS. 2A, 3A and 4.

The storage devices 130 of the public cloud platforms 120 illustratively comprise solid state drives (SSDs). Such SSDs are implemented using non-volatile memory (NVM) devices such as flash memory. Other types of NVM devices that can be used to implement at least a portion of the storage devices 130 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the public cloud platforms 120.

It is therefore to be appreciated that numerous different types of storage devices 130 can be used in public cloud platforms 120 in other embodiments. For example, a given public cloud platform 120 as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

The user devices 102 are configured to interact over the network 104 with one or more of the public cloud platforms 120. Such interaction illustratively includes generating IO operations, such as write and read requests, and sending such requests over the network 104 for processing by one or more of the public cloud platforms 120. In some embodiments, each of the user devices 102 comprises a driver configured to control delivery of IO operations from the host device to one or more of the public cloud platforms 120 over one or more paths through the network 104.

The public cloud platforms 120 may further include one or more additional modules and other components typically found in conventional implementations of public cloud storage systems, although such additional modules and other components are omitted from the figure for clarity and simplicity of illustration.

The public cloud platforms 120 in the FIG. 1 embodiment are assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the public cloud platforms 120 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the public cloud platforms 120 to reside in different data centers. Numerous other distributed implementations of the host devices and the public cloud platforms 120 are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

In some embodiments, the private cloud platform 105 can be implemented on the premises of a respective organization, such as part of a data center. For example, at least some of the sensitive data of an organization that is protected using the disclosed multi-tenant data protection techniques can be stored in a traditional data center that is not part of a public or private cloud. Likewise, one or more disclosed functions of the module 112 and/or the module 114 of the private cloud platform 105 can be implemented in a public cloud platform 120, and/or by a server device.

The private cloud platform 105 can further comprise one or more input-output devices (not shown), which illustratively comprise keyboards, displays or other types of input-output devices in any combination. Such input-output devices can be used, for example, to support one or more user interfaces 116 to the private cloud platform 105, as well as to support communication between the private cloud platform 105 and other related systems and devices not explicitly shown.

The user devices 102 and the private cloud platform 105 in the FIG. 1 embodiment are assumed to be implemented using at least one processing device. Each such processing device generally comprises at least one processor and an associated memory, and implements one or more functional modules for controlling certain features of the private cloud platform 105.

More particularly, user devices 102 and private cloud platform 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

A network interface may allow the user devices 102, the private cloud platform 105, and/or one or more of the public cloud platforms 120 to communicate over the network 104 with each other (as well as one or more other networked devices), and illustratively comprises one or more conventional transceivers.

It is to be understood that the particular set of elements shown in FIG. 1 for multi-tenant data protection using tenant-based token validation and data encryption is presented by way of illustrative example only, and in other embodiments additional or alternative elements may be used. Thus, another embodiment includes additional or alternative systems, devices and other network entities, as well as different arrangements of modules and other components.

For example, while one or more embodiments of the disclosure are illustrated using multiple cloud environments for the storage of protected multi-tenant data using tenant-based token validation and tenant-based data encryption, any cloud environment may be employed to store the encrypted multi-tenant data. For example, in other embodiments, a given public cloud platform 120 may comprise storage devices 130-1 through 130-N. In addition, one or more of public cloud platforms 120-1 through 120-N may be implemented using one or more private cloud platforms 105. Further, the disclosed techniques for multi-tenant data protection using tenant-based token validation and data encryption, as implemented in the example of FIG. 1 by the private cloud platform 105 and/or one or more public cloud platforms 120, could be implemented in other embodiments by a user device 102 and/or a traditional data center. Thus, the term "cloud environment," as used herein, shall be broadly construed to encompass public clouds, private clouds, data centers, portions thereof and/or combinations thereof, as those terms are understood by a person of ordinary skill in the art.

Figure 2A:
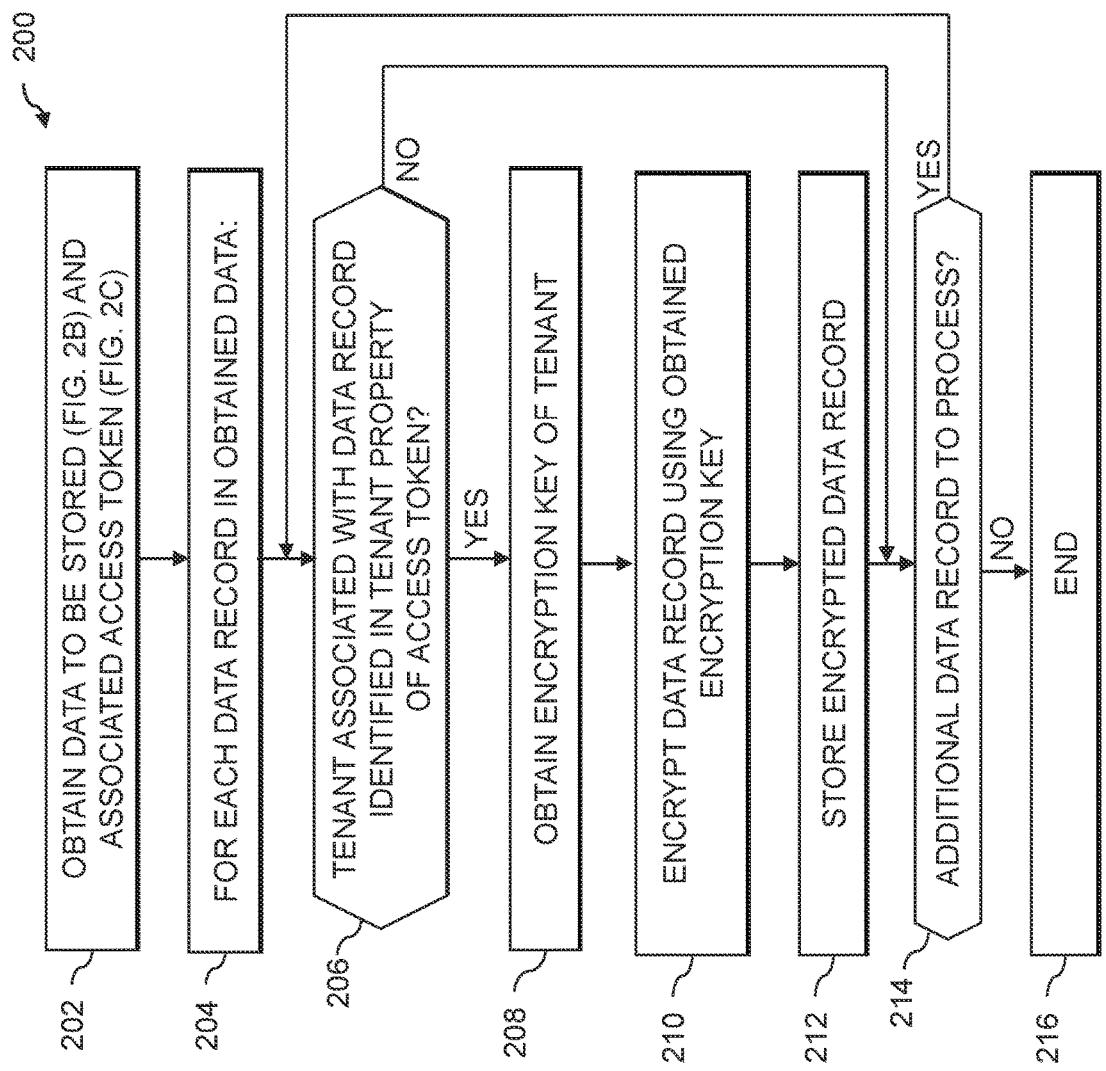
FIG. 2A is a flow diagram illustrating an exemplary implementation of a multi-tenant data storage process that uses tenant-based token validation and data encryption, according to one embodiment.

FIG. 2A is a flow diagram illustrating an exemplary implementation of a multi-tenant data storage process 200 that uses tenant-based token validation and data encryption, according to one embodiment. In the example of FIG. 2A, each data record (e.g., a document or a row in results of a Structured Query Language (SQL) query) is encrypted using a tenant-specific encryption key, provided that the user is authorized to access (e.g., write) the data of the tenant associated with the data record, as discussed further below.

In step 202, data to be stored, as discussed further below in conjunction with FIG. 2B, is obtained, as well as an associated access token 280, as discussed further below in conjunction with FIG. 2C. In step 204, a loop is then entered for each data record in the obtained data from step 202. A test is performed in step 206 to determine if the tenant associated with the current data record is identified in the tenant property of the access token 280 (e.g., a tenant-based token validation). If it is determined in step 206 that the tenant associated with the current data record is not identified in the tenant property of the access token 280, then program control proceeds to step 214, discussed below.

If, however, it is determined in step 206 that the tenant associated with the current data record is identified in the tenant property of the access token 280, then an encryption key of the tenant is obtained in step 208. The data record is then encrypted in step 210 using the obtained encryption key (e.g., a tenant-based data encryption) and the encrypted data record is stored in step 212.

A test is performed in step 214 to determine if there is an additional data record to process. If it is determined in step 214 that there is an additional data record to process, then program control returns back to step 206 to process the additional data record. Otherwise, program control ends in step 216.

FIG. 2B illustrates an exemplary data record set 240 to be stored using the multi-tenant data storage process 200 of FIG. 2A, according to some embodiments of the disclosure. In the example of FIG. 2B, each data record to be stored is identified by a record identifier and comprises a tenant identifier and a data value.

FIG. 2C illustrates an exemplary access token 280 for use in a multi-tenant storage environment, according to one or more embodiments of the disclosure. In some embodiments, the exemplary access token 280 extends a JSON Web Token (JWT), for example, that is based on an open standard (RFC 7519) and uses a JSON (JavaScript Object Notation) object.

In one or more embodiments, the exemplary access token 280 of FIG. 2C comprises a user identifier, a user name, an administrator field and a tenant field. The administrator field can be used to indicate whether the respective user has administrative privileges. The tenant field can be used to indicate that the associated user is authorized to access (e.g., read and/or write) the data of any tenants identified in the tenant field (property) of the access token 280. In addition, in some embodiments, the tenant field may alternatively indicate that the associated user has limited access (e.g., read only or write only access) to the data of one or more tenants identified in the tenant field of the access token 280.

When the user associated with access token 280 of FIG. 2C attempts to store the exemplary data record set 240 of FIG. 2B, data record 242 will be rejected in step 206, since access token 280 does not indicate that the user is authorized to access (e.g., read and/or write) the data of tenant 2.

Figure 3A:
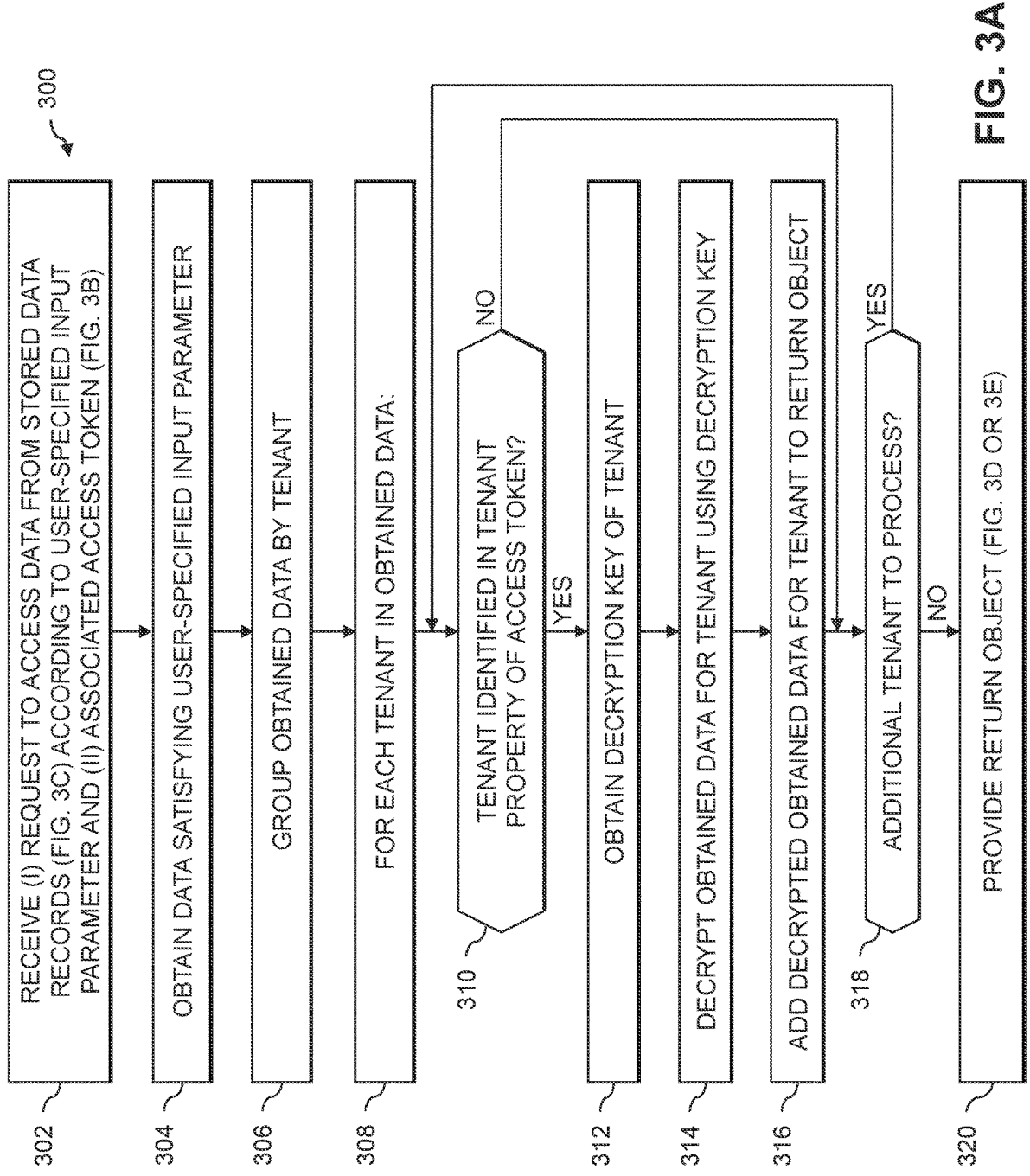
FIG. 3A is a flow diagram illustrating an exemplary implementation of a multi-tenant data read process that uses tenant-based token validation and data decryption, according to at least one embodiment.

FIG. 3A is a flow diagram illustrating an exemplary implementation of a multi-tenant data read process 300 that uses tenant-based token validation and data decryption, according to at least one embodiment. In the example of FIG. 3A, each data record that satisfies a user-specified input parameter is decrypted using a tenant-specific decryption key and provided as part of the returned data, provided that the user is authorized to access (e.g., read) the data of the tenant associated with the respective data record according to the token of the user.

In step 302, the multi-tenant data read process 300 receives (i) a request to access data from stored data records, as discussed further below in conjunction with FIG. 3C, according to a user-specified input parameter, and (ii) an access token 340, as discussed further below in conjunction with FIG. 3B, associated with the requesting user. Exemplary requests to obtain data according to exemplary user-specified input parameters are discussed further below in conjunction with FIGS. 3D and 3E.

In step 304, data satisfying the user-specified input parameter is obtained, and then the obtained data is grouped by tenant in step 306. In step 308, a loop is then entered for each tenant in the obtained data from step 304. A test is performed in step 310 to determine if the current tenant is identified in the tenant property of the access token 340.

If it is determined in step 310 that the current tenant is not identified in the tenant property of the access token 340, then program control proceeds to step 318, discussed below. If, however, it is determined in step 310 that the current tenant is identified in the tenant property of the access token 340, then the decryption key of the current tenant is obtained in step 312. The obtained data for the current tenant is then decrypted in step 314 using the obtained decryption key of the current tenant. The decrypted obtained data for the current tenant is then added in step 316 to a return object.

A test is performed in step 318 to determine if there is an additional tenant to process. If it is determined in step 318 that there is an additional tenant to process, then program control returns to step 310 to process the additional tenant. Otherwise, the return object (as discussed further below in conjunction with FIGS. 3D and 3E) is provided in step 320.

FIG. 3B illustrates an access token 340 received from another exemplary user in a multi-tenant storage environment, according to one or more embodiments of the disclosure. In at least some embodiments, the exemplary access token 340 of FIG. 3B has similar fields as the exemplary access token 280 of FIG. 2C.

FIG. 3C illustrates an exemplary data record set 370 that has been stored in a multi-tenant storage environment, according to some embodiments. In at least some embodiments, the exemplary data record set 370 of FIG. 3C has similar fields as the exemplary data record set 240 of FIG. 2B.

Figure 3D:
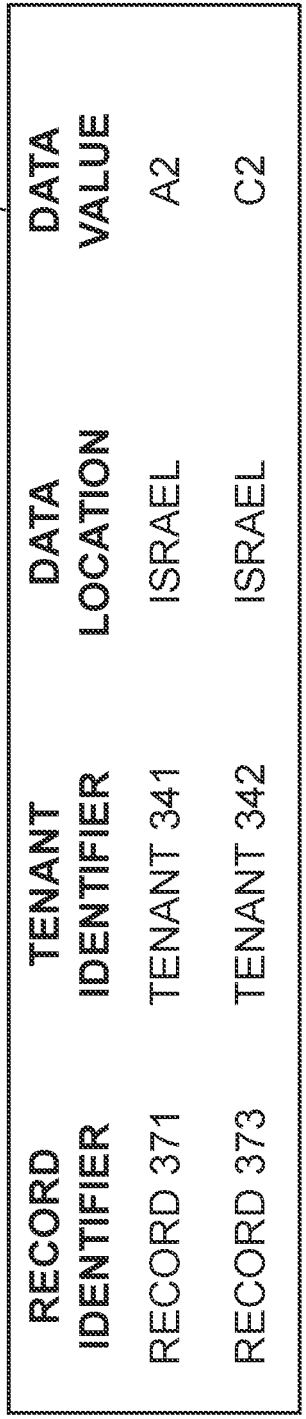
FIGS. 3D and 3E illustrate exemplary sets of data records returned from the data records of FIG. 3C in response to various read requests using the read process of FIG. 3A, according to some embodiments.
Figure 3E:
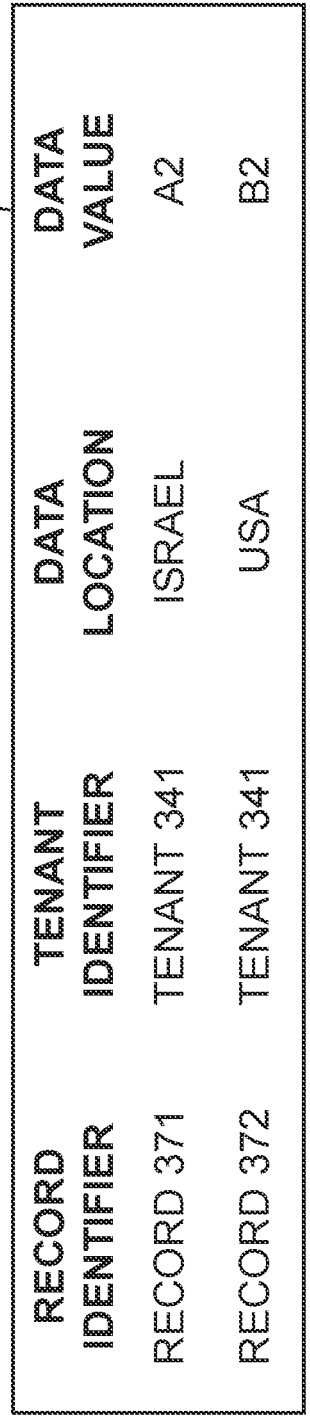

FIGS. 3D and 3E illustrate exemplary data record sets 380, 390, respectively, returned in response to particular read requests from the user associated with the access token 340 of FIG. 3B from the stored data record set 370 of FIG. 3C, according to some embodiments. In the example of FIG. 3D, the user-specified input parameter for a read request comprises a location specific input parameter that requests all data having a data location of Israel. For example, a user-specified input parameter may specify "Return all records having a data location of Israel." The data record 372 of FIG. 3C is not returned because the location of data record 372 does not satisfy the user-specified location parameter. In addition, data record 374 of FIG. 3C is not returned because the user is not authorized to access the data of tenant 343 in the access token 340.

In the example of FIG. 3E, the user-specified input parameter for a read request comprises a tenant specific input parameter that requests all data having a tenant identifier of Tenant 341. For example, a user-specified input parameter may specify "Return all records of tenant Tenant 341." The data record 373 of FIG. 3C is not returned because the tenant of data record 373 does not satisfy the user-specified tenant parameter. Likewise, data record 374 of FIG. 3C is also not returned because the tenant of data record 374 does not satisfy the user-specified tenant parameter.

Figure 4:
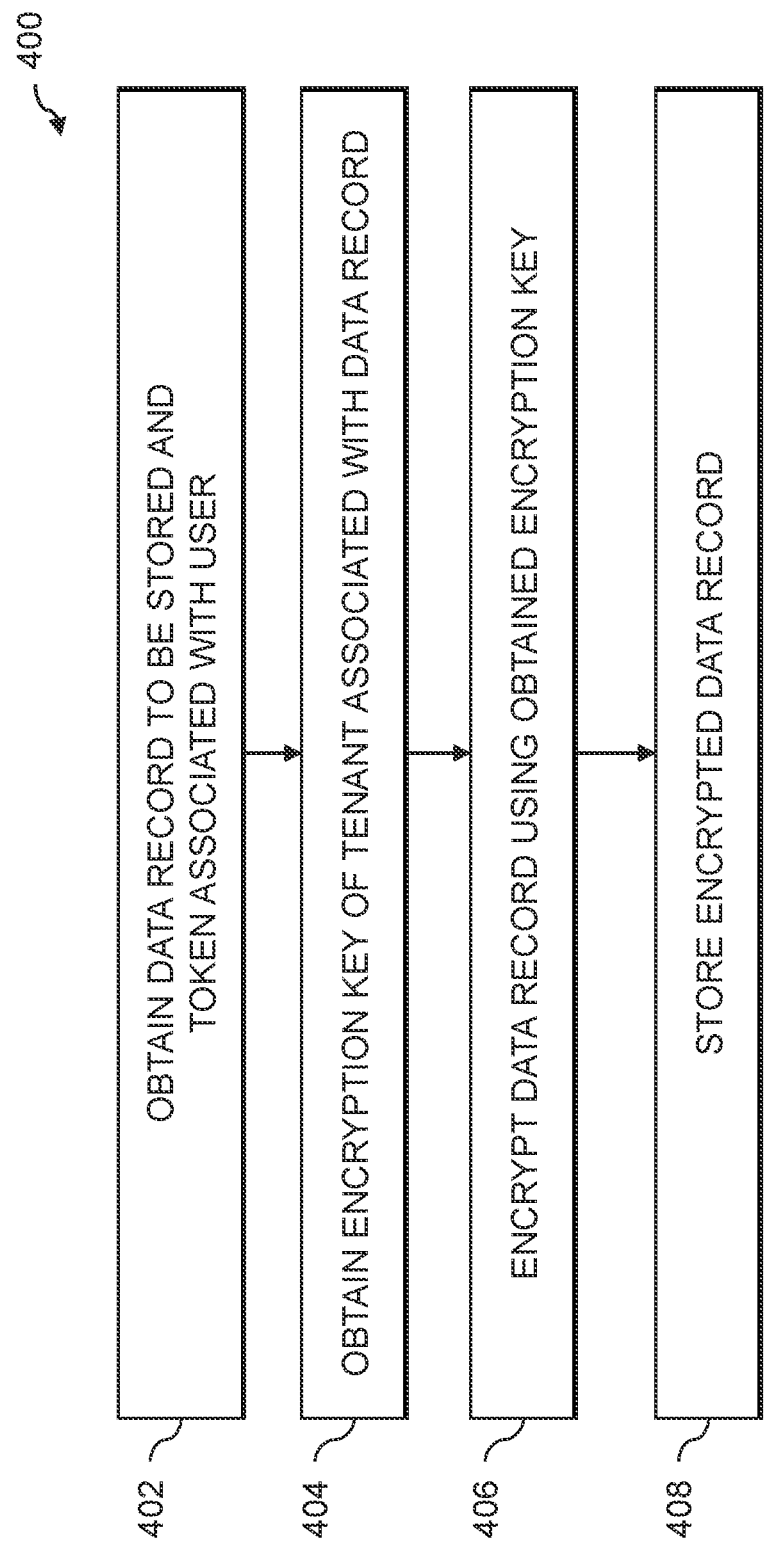
FIG. 4 is a flow diagram illustrating an exemplary implementation of a multi-tenant data storage process using tenant-based token validation and data encryption, according to at least some embodiments.

FIG. 4 is a flow diagram illustrating an exemplary implementation of a multi-tenant data storage process 400 that uses tenant-based token validation and data encryption, according to at least some embodiments. In the example of FIG. 4, a data record to be stored and a token associated with the requesting user are obtained in step 402. As discussed above, for example, in conjunction with FIG. 2B, each data record comprises a tenant identifier identifying a tenant associated with the respective data record. In addition, as discussed above, for example, in conjunction with FIG. 2C, the received token comprises a tenant field indicating that the associated user is authorized to access (e.g., read and/or write) the data of any tenants identified in the tenant field (property) of the token.

In step 404, an encryption key of the tenant associated with the data record is obtained, and the data record is encrypted in step 406 using the obtained encryption key. Finally, the encrypted data record is stored in step 408.

In at least some embodiments, an evaluation can also be performed of whether the tenant associated with the data record is identified in the received token. A given data record can be read by obtaining a decryption key of the tenant associated with the given data record and decrypting the given data record using the decryption key. In addition, a read operation may also evaluate, using the token, whether the user is authorized to access the data of the tenant associated with the given data record. The decrypted given data record can be appended to a return object in one or more embodiments.

The particular processing operations and other network functionality described in conjunction with the flow diagrams of FIGS. 2A, 3A and 4 are presented by way of illustrative example only, and should not be construed as limiting the scope of the disclosure in any way. Alternative embodiments can use other types of processing operations for multi-tenant data protection using tenant-based token validation and data encryption. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for multi-tenant data protection using tenant-based token validation and data encryption. The foregoing applications and associated embodiments should be considered as illustrative only, and numerous other embodiments can be configured using the techniques disclosed herein, in a wide variety of different applications.

Among other benefits, the disclosed techniques for multi-tenant data protection using tenant-based token validation and data encryption waste the time of a potential attacker, without their knowledge, as an attacker is not aware of the inherent data protection. In addition, the disclosed techniques for multi-tenant data protection protect against data leakage and other security threats.

In one or more embodiments, the disclosed multi-tenant data protection techniques are resilient to data theft and protect "data at rest," since each data record is encrypted with an encryption key that is specific to the associated tenant. Data isolation is also provided since an attacker can obtain the credentials of one tenant, but a request to obtain data for another tenant will be unsuccessful due to the tenant-based token validation (required verification per tenant, for example in step 206 of FIG. 2A, prevents the attacker from seeing the data of other tenants), as well as the tenant-based data encryption. In addition, the disclosed multi-tenant data protection techniques protect "data in transit," since even if an attacker can read the data (for example, in transit from a database (e.g., by the vulnerability of SSL)), the data is encrypted using the tenant-based data encryption. The encrypted data is useless for the attacker until the encrypted data is decrypted using the tenant-based decryption.

It should also be understood that the disclosed multi-tenant data protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for multi-tenant data protection may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-tenant data protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based multi-tenant data protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
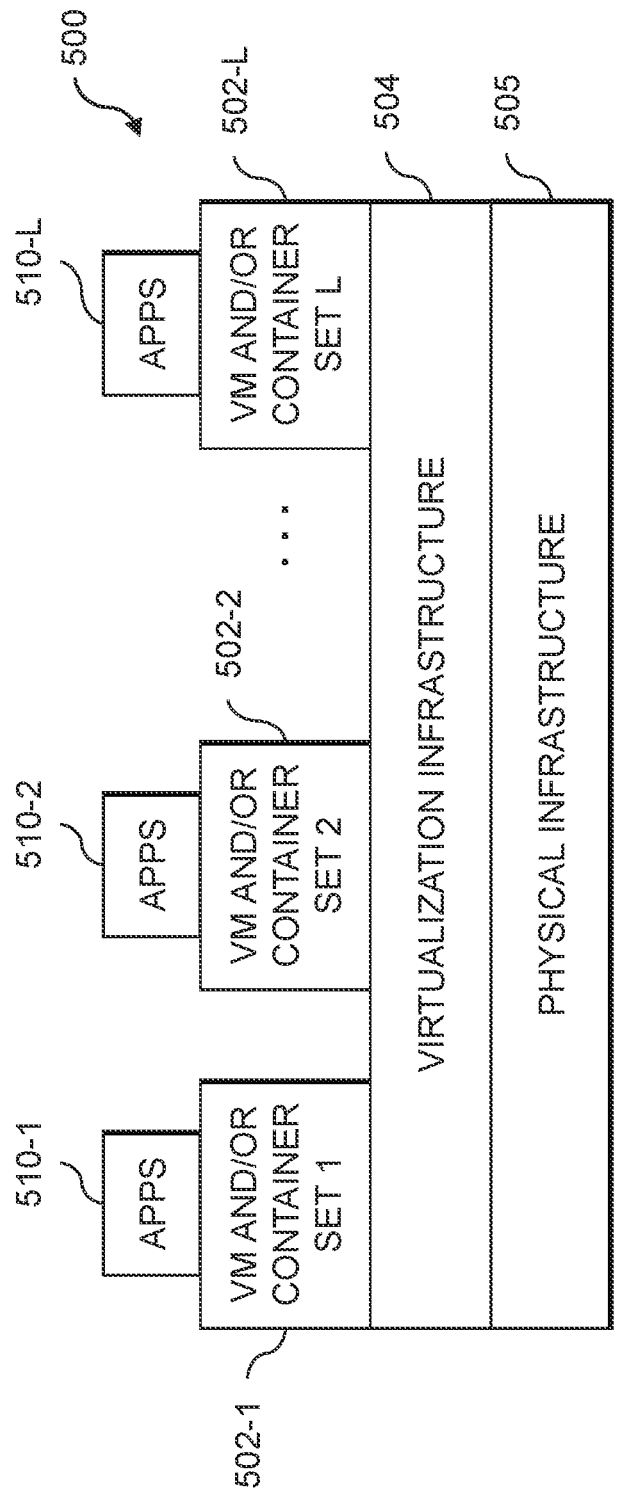
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide multi-tenant data protection functionality of the type described above for one or more processes running on a given one of the VMs. For example, each of the VMs can implement multi-tenant data protection control logic and associated token verification functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide multi-tenant data protection functionality of the type described above for one or more processes running on different ones of the containers. For example, a container host device supporting multiple containers of one or more container sets can implement one or more instances of multi-tenant data protection control logic and associated token verification functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, ... 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
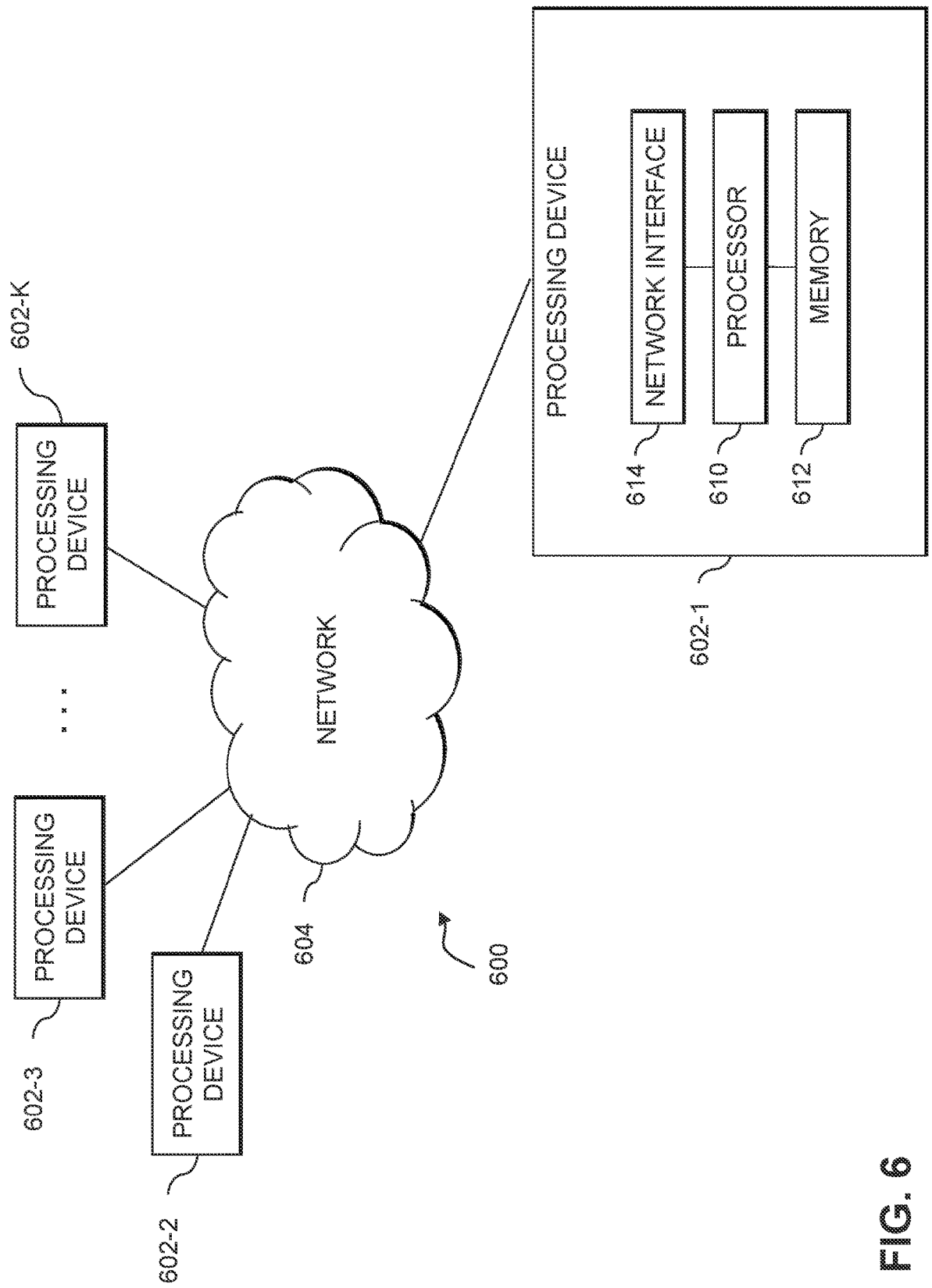
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, from a user, (i) at least one data record to be stored in a multi-tenant storage environment, and (ii) a token associated with the user, wherein each data record identifies a tenant associated with the respective data record and wherein the user is authorized to access tenant data of at least one tenant identified in the token;
performing the following steps, by at least one processing device of the multi-tenant storage environment, in response to determining that the tenant associated with the respective data record is identified in the token associated with the user:
obtaining an encryption key of the tenant associated with the at least one data record;
encrypting, by the at least one processing device of the multi-tenant storage environment, the at least one data record using the obtained encryption key; and
storing the encrypted at least one data record in the multi-tenant storage environment;
wherein the method is performed by the at least one processing device, wherein the at least one processing device comprises a processor coupled to a memory.

2. The method of claim 1, further comprising evaluating, using the token, whether the user is authorized to access the tenant data of the tenant associated with the at least one data record.

3. The method of claim 1, wherein, in response to a request by a second user to access one or more stored data records from the multi-tenant storage environment, wherein the second user provides an access token with the request, a given data record is read by the at least one processing device of the multi-tenant storage environment by performing the following steps in response to the multi-tenant storage environment determining that the tenant associated with the given data record is identified in the access token provided by the second user:
obtaining a decryption key of the tenant associated with the given data record; and
decrypting the given data record using the decryption key.

4. The method of claim 3, further comprising evaluating, using the access token, whether the second user is authorized to access the tenant data of the tenant associated with the given data record.

5. The method of claim 3, further comprising appending the decrypted given data record to a return object.

6. The method of claim 1, wherein the at least one data record comprises one or more of a document and a row of a structured query result.

7. The method of claim 1, wherein the at least one tenant comprises one or more of a business entity, an organization and a user group.

8. An apparatus comprising:
at least one processing device comprising a processor coupled to a memory;
the at least one processing device being configured to implement the following steps:
obtaining, from a user, (i) at least one data record to be stored in a multi-tenant storage environment, and (ii) a token associated with the user, wherein each data record identifies a tenant associated with the respective data record and wherein the user is authorized to access tenant data of at least one tenant identified in the token;
performing the following steps, by at least one processing device of the multi-tenant storage environment, in response to determining that the tenant associated with the respective data record is identified in the token associated with the user;
obtaining an encryption key of the tenant associated with the at least one data record;
encrypting, by the at least one processing device of the multi-tenant storage environment, the at least one data record using the obtained encryption key; and
storing the encrypted at least one data record in the multi-tenant storage environment.

9. The apparatus of claim 8, further comprising evaluating, using the token, whether the user is authorized to access the tenant data of the tenant associated with the at least one data record.

10. The apparatus of claim 8, wherein, in response to a request by a second user to access one or more stored data records from the multi-tenant storage environment, wherein the second user provides an access token with the request, a given data record is read by the at least one processing device of the multi-tenant storage environment by performing the following steps in response to the multi-tenant storage environment determining that the tenant associated with the given data record is identified in the access token provided by the second user:
obtaining a decryption key of the tenant associated with the given data record; and
decrypting the given data record using the decryption key.

11. The apparatus of claim 10, further comprising evaluating, using the access token, whether the second user is authorized to access the tenant data of the tenant associated with the given data record.

12. The apparatus of claim 10, further comprising appending the decrypted given data record to a return object.

13. The apparatus of claim 8, wherein the at least one data record comprises one or more of a document and a row of a structured query result.

14. The apparatus of claim 8, wherein the at least one tenant comprises one or more of a business entity, an organization and a user group.

15. A non-transitory processor-readable storage medium having stored therein program code of one or more software programs, wherein the program code when executed by at least one processing device causes the at least one processing device to perform the following steps:
obtaining, from a user, (i) at least one data record to be stored in a multi-tenant storage environment, and (ii) a token associated with the user, wherein each data record identifies a tenant associated with the respective data record and wherein the user is authorized to access tenant data of at least one tenant identified in the token;
performing the following steps, by at least one processing device of the multi-tenant storage environment, in response to determining that the tenant associated with the respective data record is identified in the token associated with the user;
obtaining an encryption key of the tenant associated with the at least one data record;
encrypting, by the at least one processing device of the multi-tenant storage environment, the at least one data record using the obtained encryption key; and
storing the encrypted at least one data record in the multi-tenant storage environment.

16. The non-transitory processor-readable storage medium of claim 15, further comprising evaluating, using the token, whether the user is authorized to access tenant data of the tenant associated with the at least one data record.

17. The non-transitory processor-readable storage medium of claim 15, wherein, in response to a request by a second user to access one or more stored data records from the multi-tenant storage environment, wherein the second user provides an access token with the request, a given data record is read by the at least one processing device of the multi-tenant storage environment by performing the following steps in response to the multi-tenant storage environment determining that the tenant associated with the given data record is identified in the access token provided by the second user:

obtaining a decryption key of the tenant associated with the given data record; and decrypting the given data record using the decryption key.

18. The non-transitory processor-readable storage medium of claim 17, further comprising evaluating, using the access token, whether the second user is authorized to access the tenant data of the tenant associated with the given data record.

19. The non-transitory processor-readable storage medium of claim 17, further comprising appending the decrypted given data record to a return object.

20. The non-transitory processor-readable storage medium of claim 15, wherein the at least one data record comprises one or more of a document and a row of a structured query result.

* * * * *